US012570308B2

(12) United States Patent
Cannon

(10) Patent No.: US 12,570,308 B2
(45) Date of Patent: Mar. 10, 2026

(54) MOTOR VEHICLE AND METHOD OF OPERATING A MOTOR VEHICLE

(71) Applicant: AUDI AG, Ingolstadt (DE)

(72) Inventor: Shane Cannon, Beilngries (DE)

(73) Assignee: AUDI AG, Ingolstadt (DE)

( * ) Notice: Subject to any disclaimer, the term of this patent is extended or adjusted under 35 U.S.C. 154(b) by 261 days.

(21) Appl. No.: 18/060,458

(22) Filed: Nov. 30, 2022

(65) Prior Publication Data

US 2023/0166757 A1      Jun. 1, 2023

(30) Foreign Application Priority Data

Dec. 1, 2021   (DE) .......................... 102021131529.8

(51) Int. Cl.
*B60W 50/16* (2020.01)
*B60W 10/08* (2006.01)

(52) U.S. Cl.
CPC ............ *B60W 50/16* (2013.01); *B60W 10/08* (2013.01); *B60W 2710/083* (2013.01)

(58) Field of Classification Search
None
See application file for complete search history.

(56) References Cited

U.S. PATENT DOCUMENTS

| | | | | |
|---|---|---|---|---|
| 11,001,201 | B2 * | 5/2021 | Weston ................. | B60K 20/04 |
| 2015/0199955 | A1 | 7/2015 | Draganic | |
| 2019/0016347 | A1 * | 1/2019 | Mergl ................. | B60W 50/082 |
| 2019/0047616 | A1 * | 2/2019 | Lesbirel ............... | B62D 15/029 |
| 2019/0308555 | A1 * | 10/2019 | Martin ................. | B60Q 9/008 |
| 2021/0370967 | A1 * | 12/2021 | Valeri ................. | B60W 50/04 |
| 2022/0203891 | A1 * | 6/2022 | Hong .................... | B60Q 9/008 |

FOREIGN PATENT DOCUMENTS

| | | | |
|---|---|---|---|
| DE | 102014219769 A1 | 3/2016 | |
| DE | 102017212195 A1 | 1/2019 | |
| DE | 102020116302 A1 | 1/2021 | |
| EP | 3733442 A1 | 11/2020 | |
| WO | WO 2016128673 A1 | 8/2016 | |
| WO | WO 2019149740 A1 | 8/2019 | |

* cited by examiner

*Primary Examiner* — James J Lee
*Assistant Examiner* — Elizabeth Galyn Martinez
(74) *Attorney, Agent, or Firm* — Seed Intellectual Property Law Group LLP

(57) ABSTRACT

A motor vehicle comprises a control device and a drive train having at least one electric traction motor, wherein the control device is adapted to activate at least one vibration element, which is coupled to at least one component of the motor vehicle and designed to put out a haptic signal which can be perceived by the driver of the motor vehicle, and/or the electric traction motor to generate at least one haptic signal in dependence on operating state information describing a current and/or predicted operating state of the drive train.

17 Claims, 1 Drawing Sheet

MOTOR VEHICLE AND METHOD OF OPERATING A MOTOR VEHICLE

BACKGROUND

Technical Field

Embodiments of the invention relate to a motor vehicle comprising a control device and a drive train having at least one electric traction motor. Furthermore, embodiments of the invention relate to a method of operating a motor vehicle.

Description of the Related Art

Motor vehicles with electric drive generally produce less haptic feedback during their operation than vehicles outfitted with combustion engines. This is due to less vibration during the operation of an electric motor as compared to a combustion engine on account of the design. In certain situations, haptic feedback of the vehicle can improve the control capacity of the motor vehicle, for example in situations where the road gripping of the tires of the motor vehicle is reduced. Such a situation may occur, for example, on snow-covered roads.

The haptic feedback of a vehicle having a combustion engine makes it possible to operate the gas pedal precisely, for example, and to perform an acceleration or torque demand shortly before or even when a loss of adhesion of a tire with the road occurs. This may be more difficult to perceive in vehicles having an electric motor, since because of the reduced haptic feedback it may be more difficult or unaccustomed to determine a reduction or loss of tire gripping of the road. Various methods and devices are known in the prior art for generating haptic feedback for the driver of a motor vehicle.

In WO 2016/128673 A1, a device is described for generating haptic feedback for a motor vehicle. The device here comprises an electrically operated vibration actuator, which places a tactile surface in vibration. Furthermore a passive resonator is arranged on the tactile surface, which is excited by the surface placed in oscillation by the actuator.

From DE 10 2020 116 302 A1 there is known a motor vehicle which provides a haptic feedback for a gear shifting mechanism. The motor vehicle here comprises a shift input device for a vehicle transmission and a computer, the computer being adapted to detect a user input for shifting the vehicle transmission via the shift input device and to generate a haptic feedback via the shift input device upon detecting the user input.

WO 2019/149740 A1 describes a seat belt for a motor vehicle, in which a device for generating of vibrations is arranged. Through the device, haptic signals can be put out to the driver of the motor vehicle, warning him or her in certain situations.

BRIEF SUMMARY

Some embodiments improve the control ability of a motor vehicle driven by an electric motor.

Some embodiments include a motor vehicle of the kind mentioned above, wherein the control device is adapted to activate at least one vibration element, which is coupled to at least one component of the motor vehicle and designed to put out a haptic signal which can be perceived by the driver of the motor vehicle, and/or the electric traction motor to generate at least one haptic signal in dependence on operating state information describing a current and/or predicted operating state of the drive train.

The motor vehicle can be a purely electric motor vehicle, which can be driven by one or more electric traction motors. It is also possible for the motor vehicle to be a hybrid vehicle, which comprises a combustion engine in addition to a traction motor, in particular the motor vehicle can also be moved only by the electric motor in a purely electric driving operation. The motor vehicle can be a passenger car or a motorcycle. The degree of influence of haptic feedback on the control ability of the motor vehicle can depend on the type of the motor vehicle and be more pronounced, for example in an electrically driven motorcycle as compared to a motorcycle with combustion engine, than in a comparison between a passenger car with electric traction motor and a passenger car with combustion engine. Moreover, the effect of haptic feedback on the control ability of the motor vehicle can also depend on personal tastes of the driver.

The use of the electric traction motor of the motor vehicle and/or the vibration element to generate the haptic signal has the advantage that a haptic feedback can be given to the driver through the operating state of the drive train. Thus, the driver receives a haptic feedback via the current operating state of the motor vehicle, even if there are no or only few vibrations of the drive train in the current operating situation. This can be the case in particular in a purely electrical driving operation of the motor vehicle, since the electric traction motor generates less vibrations as compared to a combustion engine. By generating the additional haptic feedback by generating the haptic signal, this can be balanced out, so that the haptic feedback or the perceivable behavior of the motor vehicle also resembles or corresponds to a motor vehicle with combustion engine, even in the electric operation.

The generating of an additional haptic feedback has the advantage that the control ability of the vehicle is improved, even in a purely electrical driving operation of the motor vehicle, thanks to the additional haptic feedback by the haptic signal of the vibration element or the electric traction motor. In certain driving situations, especially in driving situations which are in a border region for the adhesion of the motor vehicle, the control ability of the motor vehicle can thus be improved. Thanks to the additional haptic feedback, it is easier to perform a fast and/or possibly a forward-looking easing off of the gas pedal if a loss of adhesion with the road occurs for at least one wheel of the drive train. Thus, the fine control of the motor vehicle can be improved.

The control of the motor vehicle in such borderline situations can be perceived as more difficult in the case of only slight haptic feedback, which may occur during an operation of the motor vehicle without the vibration element or without generating the haptic signal through the electric traction motor, since for example an easing off of the gas pedal will be done only when a loss of adhesion of a wheel is determined in another way by the driver. The absence of haptic feedback in a purely electrical driving operation may lead to a more risky driving style, since the reaction to certain situations such as loss of static friction occurs only at a later time.

The feedback of the current status of the drive train to the driver is improved by the vibration element, which is activated in dependence on operating state information describing the current and/or a predicted operating state of the drive train. The vibration element is arranged in the vicinity of the driver in the motor vehicle such that the driver can feel the vibration of the vibration element when the haptic signal is put out. Thanks to the vibration element, the vibration behavior of a vehicle driven by a combustion engine can be simulated in particular to be perceived at least by the driver.

The vibration element can be activated in particular in ongoing manner in dependence on the current operating state, so that the haptic behavior of the vibration element or the perceiving of the haptic signal by the driver of the motor vehicle corresponds at least substantially to a vehicle driven by a combustion engine. In addition or alternatively to the at least one vibration element, the haptic signal can also be generated via the electric traction motor, which then generates stronger vibrations of the drive train.

The generating of the haptic signal makes it possible for the driver to act on the controls of the motor vehicle in a forward-looking or intuitive manner before certain unwanted conditions occur, such as the loss of the vehicle's adhesion with the road. In the case of a driving operation of the motor vehicle in a borderline state of adhesion, which may occur for example on a snow-covered road, a combustion engine may be perceived to be easier to control, since because of its inertia during actuation, its noise, and its haptically perceivable vibrations there is different feedback of the current driving condition than that of an electric traction motor.

The feedback of a combustion engine depending on the tastes of the driver for an intuitive and forward-looking driving style, especially for an easing off of the gas before loss of adhesion, may be perceived as being more pleasant than the corresponding feedback of an electric motor in this situation. The generating of the haptic signal through the vibration element and/or the electric traction motor can make it possible in particular to create a behavior similar or identical to a combustion engine operation even in a purely electrically operated vehicle.

The operating state information which is used to generate the haptic signal can be determined by the control device itself, for which the control device will evaluate for example current and/or setpoint operating parameters of the electric traction motor and/or other components of the drive train. It is also possible to relay the operating state information from another controller of the motor vehicle to the control device. The relaying can occur here through a communication link of the motor vehicle, such as a communication bus.

The operating state of the drive train depends in particular on the operating state of the electric traction motor and/or another moving component of the drive train, which would relay in particular vibrations generated by a combustion engine. The operating state of the drive train can be described in this case in particular by the rotary speed, the torque, a change in rotary speed and/or a change in torque of the electric traction motor and/or at least one further component of the drive train.

In some embodiments, it can be provided that the vibration element is arranged on a control device of the motor vehicle, in particular a steering device, a gas pedal, a brake pedal and/or a transmission control element, and/or the vibration element is arranged on a driver's seat and/or on a vehicle structure, especially on a vehicle floor. The vibration element can be arranged in particular on the vehicle floor in a region in front of the driver's seat or between the front edge of the driver's seat and the pedal rest, so that a haptic signal generated by the vibration element can be perceived through the feet or legs of the driver.

In some embodiments, it can be provided that the vibration element is designed as a linear resonant actuator or as an actuator with eccentric rotating mass. These designs make it possible to generate haptic signals in which both a frequency of the haptic signal and an amplitude of the haptic signal can be adjusted. The control device is designed to activate the vibration element and it can thus put out corresponding activation signals which activate the vibration element to generate the haptic signal. It is possible, in the case of using multiple vibration elements, to also configure one or more of the vibration elements as a linear resonant actuator or an actuator with eccentric rotating mass.

In some embodiments, it can be provided that the control device is adapted to superimpose a torque output of the electric traction motor with the haptic signal upon generating the haptic signal by the electric traction motor. In this way, for example, the torque output of the electric traction motor can be pulsating, thereby likewise adjusting corresponding vibrations in the drive train which are perceivable by the driver of the motor vehicle.

In some embodiments, it can be provided that the operating state information describes a current and/or a predicted rotary speed of one component of the drive train, especially a wheel of the drive train and/or of the electric traction motor, wherein the control device is adapted to determine at least one frequency and/or at least one amplitude of the haptic signal in dependence on the rotary speed. The haptic signal can thus be determined, for example, in dependence on the current speed of travel of the motor vehicle.

It is possible for the haptic signal to contain multiple frequencies, for example, the haptic signal is generated as a superpositioning of multiple different frequencies. This makes it possible to represent, for example, different rotary speeds of components of the drive train, such as a different rotary speed of a wheel and/or of the traction motor, in the haptic signal and thus make them perceptible to the driver of the motor vehicle. For example, the haptic signal can be generated as a superpositioning of multiple sinusoidal signal components, each of them having their own frequency and/or their own amplitude.

The generating of a haptic signal in dependence on a rotary speed makes it possible to simulate, for example, the behavior of the anti-lock braking system (ABS) during the braking of the motor vehicle, i.e., during a decreasing rotary speed. The vibrations typically produced by a pump of the ABS can thus be generated as a haptic signal and can strengthen any existing vibrations attributable to the operation of an ABS of the motor vehicle. This also improves the control ability of the motor vehicle in a braking operation, especially during loss of adhesion occurring in a braking operation, thanks to the increased haptic feedback to the driver.

In some embodiments, it can be provided that the operating state information describes a current and/or a predicted torque of one component of the drive train, especially the electric traction motor, wherein the control device is adapted to determine at least one frequency and/or at least one amplitude of the haptic signal in dependence on the torque. By adapting the amplitude of the haptic signal in dependence on the torque of a component of the drive train, such as the traction mode, it is possible to adjust the strength of the vibration which can be perceived by the driver to the current operating state of the drive train.

In operating states in which a large torque is present, a large amplitude of the haptic signal can thus be generated, so that stronger vibrations can be put out than in an operating state in which only a low torque is generated. This makes it possible to adjust the behavior of the vibration element or the electric traction motor and thus the vibration perceivable by the driver of the motor vehicle to the vibrations actually occurring in the operation of a motor vehicle, especially a motor vehicle having a combustion engine.

In some embodiments, it can be provided that the operating state information describes a current and/or a predicted state of adhesion of at least one wheel of the drive train, wherein the control device is adapted to determine at least one frequency and/or at least one amplitude of the haptic signal in dependence on the state of adhesion. The state of adhesion of a wheel can be determined, for example, with the aid of a sensor device, such as a wheel rotary speed sensor, a sensor of an anti-lock braking system, or the like.

The vibration behavior of the drive train may change if the state of adhesion of at least one wheel of the drive train changes. By generating the haptic signal in dependence on the state of adhesion, it becomes possible to strengthen the actual vibrations of the motor vehicle and/or to generate vibrations coordinated with the current state of adhesion when operating a motor vehicle having a combustion engine.

In some embodiments, it can be provided that the control device is adapted to determine the haptic signal in dependence on selection information describing a user selection. The selection information can be, e.g., the choice from a plurality of different driving modes. Depending on a selected driving mode, the strength or the amplitude of the haptic signal can be adjusted to generate haptic feedback of different strengths.

In addition or alternatively, the selection information can also involve the activating and/or the deactivating of the haptic feedback, so that the generating of the haptic signal can be switched on or off, e.g., at the wishes of the driver. It is also possible to switch off the generating of the haptic signal in certain driving modes, such as a comfort mode, for example by setting an amplitude of zero or the like.

In addition or alternatively, the selection information can also involve different types of combustion engines whose generated vibration is simulated by the haptic signal. For example, the vibration behavior of single cylinder or multicylinder combustion engines can be selected and simulated by the haptic signal or the vibration element and/or the electric traction motor. The user selection described by the selection information can be done for example by a user of the motor vehicle through a user interface, such as a user interface and/or a multimedia device of the motor vehicle.

In some embodiments, it can be provided that the motor vehicle comprises multiple vibration elements, which can be activated by the control device at the same time or in dependence on vibration information describing at least one partial set of the vibration elements to generate at least one haptic signal. This makes possible, for example, a selection on the part of the user of the vibration elements used for the haptic feedback. In this way, a further adapting of the vibration behavior of the motor vehicle by the user to the tastes of the user can be done. In a motor vehicle having multiple vibration elements, an individual haptic signal can be determined for each vibration element or a haptic signal can be determined and put out corresponding to the plurality of vibration elements or the selected partial set of vibration elements.

In some embodiments, it can be provided that the motor vehicle comprises a loudspeaker device, wherein the control device is adapted to operate the loudspeaker device to generate an acoustic signal in dependence on the ascertained haptic signal and/or the operating state information. The activating of a loudspeaker device of the motor vehicle comprising at least one loudspeaker to generate the acoustic signal has the advantage that the simulation of the operation of the motor vehicle through a combustion engine can be further improved.

By generating the acoustic signal in dependence on the ascertained haptic signal and/or in dependence on the operating state information, it is possible to generate the output tone of the loudspeaker device corresponding to an operation of the motor vehicle in dependence on the current operating state via a combustion engine. It is also possible for the generating of the acoustic signal to be dependent on a selection on the part of the user, so that the generating of the acoustic signal can be switched on and off by the user of the motor vehicle and/or different kinds of generating of the acoustic signal can be selected, for example according to different types of combustion engines.

In some embodiments, it can be provided that the control device is adapted to delay the torque output of the electric traction motor by the haptic signal and/or in dependence on selection information describing a user selection. Thanks to the delaying of the torque output of the traction motor after arrival or generating of a command for the torque output by the traction motor, the behavior of the electric traction motor is equivalent to the behavior of a combustion engine. In particular, in combination with the putting out of a haptic signal producing a vibration through the traction motor and/or through the vibration element, it is thus possible to completely simulate the behavior of a combustion engine which is haptically perceivable by the driver. In this way the control ability of the motor vehicle or an intuitive operating capacity of the motor vehicle are improved.

The delaying of the torque output can be generated by the haptic signal, for example when the operating state information describes an acceleration of the motor vehicle, for example through a rotary speed change and/or a torque change of a component of the drive train. In addition or alternatively, the delayed torque output can also be accomplished by a change in the actuation of the electric machine and thus regardless of any additional haptic signal generated. This makes it possible to bring about the delayed torque output even when generating the haptic signal through the vibration element. The setting of the delay for the torque output in dependence on the selection information describing a user selection makes it possible for the user to select, for example in a user menu of a user interface of the motor vehicle, whether the behavior of the electric traction motor should continue to be adapted to the behavior of a combustion engine also in regard to the torque output.

In some embodiments, the motor vehicle can be a passenger car or a motorcycle.

In some embodiments of a method for operating a motor vehicle comprising a control device and a drive train having at least one electric traction motor, it is provided that the control device activates at least one vibration element, which is coupled to at least one component of the motor vehicle and adapted to put out a haptic signal perceivable by the driver of the motor vehicle, and/or the electric traction motor to generate a haptic signal in dependence on operating state information describing a current and/or a predicted operating state of the drive train.

In order to generate the haptic signal, it is possible to use a vibration element which is arranged on a control device of the motor vehicle, in particular a steering device, a gas pedal, a brake pedal and/or a transmission control element, and/or which is arranged on a driver's seat and/or on a vehicle structure, especially on a vehicle floor.

In some embodiments, a vibration element can be used which is designed as a linear resonant actuator or as an actuator with eccentric rotating mass.

In some embodiments, a torque output of the traction motor can be superimposed with the haptic signal when generating the haptic signal by the electric traction motor.

In some embodiments, the operating state information can describe a current and/or a predicted rotary speed of one component of the drive train, especially a wheel of the drive train and/or of the electric traction motor, wherein the control device is adapted to determine at least one frequency and/or at least one amplitude of the haptic signal in dependence on the rotary speed.

In some embodiments, it can be provided that the operating state information describes a current and/or a predicted torque of one component of the drive train, especially the electric traction motor, wherein the control device determines at least one amplitude of the haptic signal in dependence on the torque.

In some embodiments, it can be provided that the operating state information describes a current and/or a predicted state of adhesion of at least one wheel of the drive train, wherein the control device determines at least one frequency and/or at least one amplitude of the haptic signal in dependence on the state of adhesion.

In some embodiments, it can be provided that the haptic signal is determined by the control device in dependence on selection information describing a user selection.

The motor vehicle can comprise multiple vibration elements, which can be activated by the control device at the same time or in dependence on vibration information describing at least one partial set of the vibration elements to generate at least one haptic signal.

It can be provided that the motor vehicle comprises a loudspeaker device, wherein the loudspeaker device is activated by the control device to generate an acoustic signal in dependence on the ascertained haptic signal and/or the operating state information.

The control device can delay the torque output of the electric traction motor by the haptic signal and/or in dependence on selection information describing a user selection.

All of the benefits and configurations described above in relation to the motor vehicle described herein hold accordingly for the method described herein, and vice versa.

BRIEF DESCRIPTION OF THE SEVERAL VIEWS OF THE DRAWINGS

Further benefits and details will emerge from the following described embodiments, as well as with the aid of the drawings.

DETAILED DESCRIPTION

Figure 1:
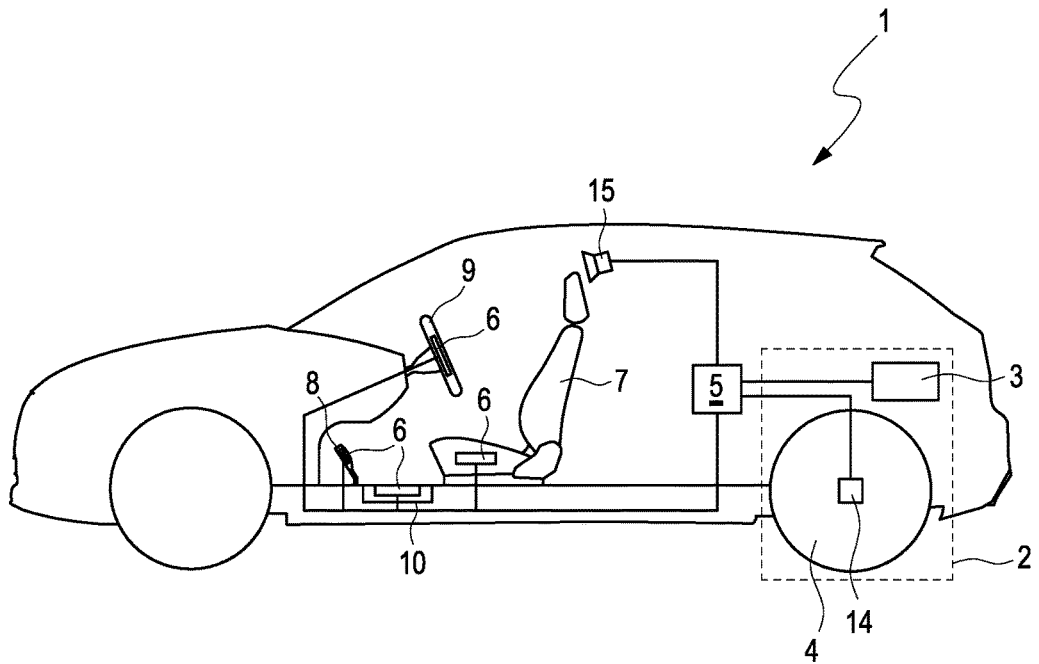
FIG. 1 shows an embodiment of a motor vehicle to explain an embodiment of a method.

FIG. 1 shows an embodiment of a motor vehicle 1. The motor vehicle 1 comprises a drive train 2, while the drive train 2 comprises an electric traction motor 3 and at least one wheel 4 of the motor vehicle 1. The drive train 2 can comprise further components of the motor vehicle 1, in particular further wheels of the motor vehicle 1 as well as further components for distributing the mechanical power generated by the electric traction motor 3 to the at least one wheel 4.

The motor vehicle 1 furthermore comprises a control device 5 as well as multiple vibration elements 6, each of which is coupled to at least one component of the motor vehicle 1 and is designed to put out a haptic signal perceivable by the driver of the motor vehicle 1. In the present embodiment, each vibration element 6 is coupled to a driver's seat 7 of the motor vehicle 1, a gas pedal 8 of the motor vehicle 1, and a steering device 9 of the motor vehicle 1, configured as a steering wheel.

A further vibration element 6 is arranged on a vehicle structure 10 of the motor vehicle 1. The vehicle structure 10 can be, for example, a vehicle floor of the motor vehicle 1. The vibration elements 6 are arranged such that they generate a haptic signal upon vibrating, which can be perceived by the driver of the motor vehicle 1, sitting for example on the motor vehicle seat 7. The vibration elements 6 can each be arranged on or inside the corresponding component of the motor vehicle 1.

The control device 5 is adapted to activate the vibration elements 6 and/or the electric traction motor 3 to generate a haptic signal. In this process, the control device 5 determines the haptic signal in dependence on operating state information describing a current and/or predicted operating state of the drive train 2. The operating state information can be ascertained by the control device 5 itself or be relayed to it through a communication link of the motor vehicle 1, such as a communication bus or the like.

The vibration elements 6 are each designed as a linear resonant actuator, in particular. Alternatively, it is possible to design all or some of the vibration elements 6 as actuators with eccentric rotating mass, for example, as electric rotation machines with imbalance, or the like. The vibration elements can thus be activated to generate a vibration signal, having at least one frequency and at least one amplitude. It is possible for the haptic signals to be formed from multiple signal components, each of them being sinusoidal, for example, and having one frequency and one amplitude, so that multiple frequencies and/or amplitudes may be present within a haptic signal.

Figure 2:
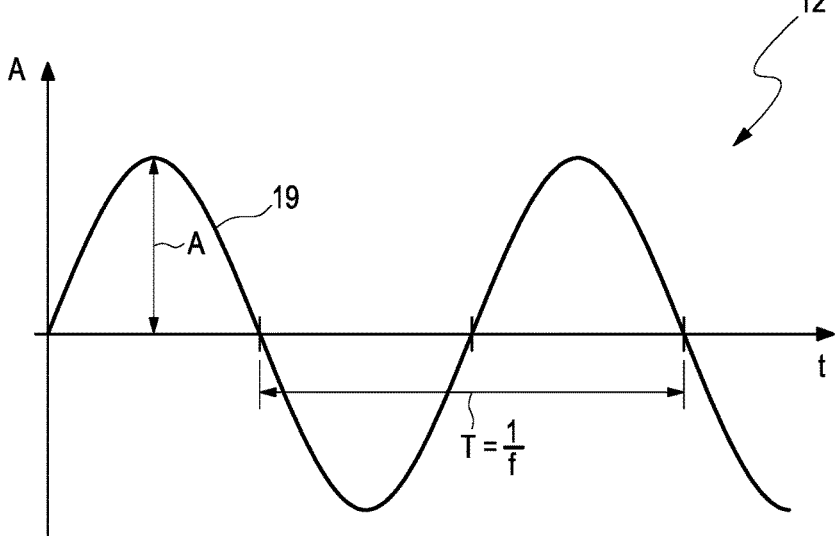
FIG. 2 shows a diagram showing a haptic signal plotted against time.

FIG. 2 shows schematically a diagram 12 with a curve 13, representing the function of a haptic signal. The amplitude of the signal is indicated as A. The frequency f of the signal results as the inverse of the period T of the haptic signal. When using a haptic signal comprising multiple signal components, multiple signal components corresponding to curve 13 in diagram 12 may be superimposed, and the respective signal components may differ in regard to their frequency, their amplitude and/or their phase position.

The control device 5 is adapted to activate at least one of the vibration elements 6 and/or the electric traction motor 3 in a method for the operation of the motor vehicle 1 in order to generate a haptic signal. The haptic signal will improve the haptic feedback to the driver of the motor vehicle 1, since the haptic signal which the driver can perceive is generated in dependence on the operating state of the drive train 2 of the motor vehicle. This simplifies the control of the motor vehicle 1 especially in situations where a fast and an intuitive response to various circumstances is required. In particular when operating the motor vehicle 1 in a borderline area, for example in a borderline area for the adhesion of the motor vehicle 1 on snow-covered ground, for example, the control of the motor vehicle 1 can become easier in this way. A forward-looking and intuitive handling of the motor vehicle 1 becomes easier, so that for example the gas pedal 8 can be eased off shortly before a wheel 4 of the motor vehicle 1 loses its adhesion, as perceived through the haptic signal.

The control device 5 is designed to activate the vibration elements 6 and the electric traction motor 3 to generate the haptic signal. The haptic signal can be generated by vibration elements 6 directly as a vibration, resulting accordingly in a vibration of the driver's seat 7, the gas pedal 8, the steering device 9 and/or the vehicle structure 10 as well. When the haptic signal is generated by the traction motor 3, a torque output of the traction motor 3 will be superimposed with the haptic signal. In this way, for example, a pulsating torque of the electric traction motor 3 can result, similar or equivalent to the torque output of a combustion engine.

The operating state information can describe various state variables in the drive train 2, so that the generated haptic signal can be adapted as precisely as possible to the current state of the drive train 2 and thus to the current driving situation of the motor vehicle 1. The operating state information can describe a current and/or predicted rotary speed of a component of the drive train 2, such as a rotary speed of the wheel 4 and/or of the electric traction motor 3.

The rotary speed of the electric traction motor 3 can be relayed for example by a controller of the traction motor 3 (not shown here) to the control device 5. For example, a rotary speed of the wheel 4 can be determined via a wheel rotary speed sensor 14, which communicates with the control device 5. The control device 5 can determine in particular a frequency of the haptic signal in dependence on the rotary speed as described by the operating state information and activate accordingly one or more of the vibration elements 6 and/or the traction motor 3 to generate the haptic signal. In addition or alternatively, it is also possible to determine the amplitude in dependence on the rotary speed.

The determination of the frequency and/or the amplitude of the haptic signal in dependence on a rotary speed of a component of the drive train 2 can be done in particular in such short time intervals that the haptic signal can follow a rotary speed change of the component. Generating the haptic signal in dependence on a rotary speed makes it possible to simulate for example the behavior of an anti-lock braking system (ABS) during the braking of the motor vehicle 1, i.e., during diminishing rotary speed. Thus, the vibrations typically produced by a pump of the ABS can be generated as the haptics signal and can strengthen any vibrations which are present, due to the operation of an ABS of the motor vehicle 1. This also improves the control ability of the motor vehicle 1 during a braking operation of the motor vehicle 1, especially during a loss of adhesion occurring in a braking operation, thanks to the increased haptic feedback to the driver.

Furthermore, it is possible for the operating state information to describe a current and/or predicted torque of a component of the drive train 2, especially a torque of the electric traction motor 3. In dependence on this torque, the control device 5 can determine a frequency and/or an amplitude of the haptic signal and activate accordingly the vibration elements 6 or the traction motor 3 to generate the haptic signal. The determining of the frequency and/or the amplitude of the haptic signal in dependence on the torque of a component of the drive train 2 can also be done in particular in such short time intervals that the haptic signal can follow a torque change of the component, in particular.

Furthermore, it is possible for the operating state information to describe a current and/or predicted state of adhesion of the at least one wheel 4 of the motor vehicle 1. The control device 5 can determine a frequency and/or an amplitude of the haptic signal in dependence on the state of adhesion of the at least one wheel 4, so that the driver of the motor vehicle obtains haptic feedback as to the state of adhesion of the motor vehicle 1. The state of adhesion of the wheel 4 can also be determined, for example, through the wheel rotary speed sensor 14 and/or through further sensors (not shown here) of the motor vehicle 1.

The control device 5 can determine the haptic signal in dependence on the operating state information in particular such that the behavior of the motor vehicle 1 is similar or equivalent to a motor vehicle driven by a combustion engine. This makes it possible, in the case of a purely electric driving operation of the motor vehicle 1, i.e., a driving operation in which the motor vehicle 1 is operated only through the electric traction motor 3, to generate the haptic feedback of a motor vehicle operated through a combustion engine in a way perceivable by the driver. In this way, the handling of the motor vehicle 1 in the purely electric driving operation becomes easier, since additional haptic feedback is generated through the vibration elements 6 and/or the traction motor 3.

The control device 5 can furthermore determine the haptic signal in dependence on selection information describing a user selection. The selection information can be entered by the user, for example through a user interface (not shown here) of the motor vehicle 1. This makes it possible to adapt the vibration behavior or the generating of the haptic signals to different types of combustion engines, such as engines with one cylinder or with multiple cylinders.

Moreover, a vibration behavior can also be selected which has been specially adapted to the motor vehicle 1 and does not conform to a predetermined profile of a combustion engine. Furthermore, it is possible for the user to set the turning on or turning off of the sending of the haptic signal in the motor vehicle 1 through the selection information. In this way, the driver can select, according to his or her preference, a haptic feedback through the haptic signal or an overall amplified haptic feedback of the motor vehicle 1 during the operation of the motor vehicle 1.

It is possible for the control device to activate the vibration elements 6 in dependence on vibration information describing all or some of the set of vibration elements 6. In addition or alternatively to generating the haptic signal through the traction motor 3, the driver can thus also select one or more of the vibration elements 6 by which the sending of the haptic signal will be done. It is also possible to switch off the sending of a signal through the vibration elements 6, so that the sending of the haptic signal will occur by choice only through the traction motor 3, or even not at all.

In order to further intensify the simulation of an operation of the motor vehicle 1 through a combustion engine in the purely electric driving mode of the motor vehicle 1, the control device 5 can activate a loudspeaker device 15, having at least one loudspeaker. In this case, the control device 5 can determine an acoustic signal in dependence on the ascertained haptic signal and/or the operating state information and activate the loudspeaker device 15 to put out the acoustic signal. In this way, the driver of the motor vehicle 1 can also be given acoustic feedback as to the current operating state of the motor vehicle 1. The putting out of the acoustic signal in addition to the sending of the haptic signal further improves the control ability of the motor vehicle, since an intuitive reaction to the current operating state of the motor vehicle becomes even easier. The sending of the acoustic signal through the loudspeaker device 15 can likewise occur in dependence on a user selection, so that a user can also switch the sending of the acoustic signal on or off.

A further option for adapting the behavior of the motor vehicle 1 can be to delay a torque output of the traction motor 3. The control device 5 can implement this, for example by activating a power electronic circuit connected to the traction motor 3, and/or by means of the haptic signal generated by the control device 5. The delaying of the torque output of the traction motor 3 can also be done in dependence on selection information describing a user selection, so that this simulation function for the behavior of the motor vehicle 1 can also be switched on or off at the driver's choice.

The motor vehicle can have, besides the traction motor 3, also a further electric traction motor and/or an additional combustion engine. The sending of the haptic signal through the vibration elements 6 and the electric traction motor 3 will occur in particular in a purely electric driving operation of the motor vehicle 1.

The motor vehicle 1 can be a passenger car, as represented schematically in FIG. 1. However, it is also conceivable to employ a corresponding method for operating a motor vehicle for another type of motor vehicle, such as a motorcycle or the like, since an improved haptic feedback of the vehicle can also result in improved control ability in other types of motor vehicles. For example, an improved control ability can also be created in an electrically operated motorcycle, for example if it has the vibration behavior of a motorcycle with a high-capacity single-cylinder engine.

Besides the vibration elements 6 shown, other vibration elements 6 can also be provided. These can be coupled for example to a brake pedal and/or other vehicle structures, especially in the vicinity of the driver's seat 7. A vibration element 6 can also be arranged on a transmission control element, by which the transmission of the motor vehicle 1 can be operated.

Besides the depicted configuration of the motor vehicle 1 as a passenger car, the motor vehicle 1 can also be configured as a motorcycle. In this case, the at least one vibration element 6 can be arranged for example on the handlebars, especially the throttle, a brake lever, and/or a foot-operated control element, especially on a brake pedal and/or a clutch pedal of the motorcycle. In addition or alternatively, a vibration element 6 can also be arranged on a motorcycle seat or a vehicle structure, such as a frame and/or a foot rest. The further remarks presented above in regard to the method and the motor vehicle 1 also apply analogously to a configuration of the motor vehicle 1 as a motorcycle.

German patent application no. 10 2021 131529.8, filed Dec. 1, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A motor vehicle, comprising:
a controller;
a drive train having at least one wheel and at least one electric traction motor that, in operation, causes the at least one wheel to rotate; and
at least one vibration element that is coupled to at least one component of the motor vehicle,
wherein the controller, in operation, activates the at least one electric traction motor and the at least one vibration element to generate a plurality of haptic signals based on operating state information describing a current and/or predicted operating state of the drive train,
wherein the controller, in operation, superimposes a torque output of the at least one electric traction motor with the haptic signals,
wherein the haptic signals include at least a first haptic signal and a second haptic signal that is different from the first haptic signal,
wherein the controller, in operation, superimposes the torque output of the at least one electric traction motor with the first haptic signal while the motor vehicle is accelerating,
wherein the controller, in operation, superimposes the torque output of the at least one electric traction motor with the second haptic signal while the motor vehicle is braking, and
wherein the second haptic signal simulates an anti-lock braking system.

2. The motor vehicle according to claim 1, wherein the at least one vibration element is arranged on a gas pedal, a brake pedal and/or a transmission control element, and/or the at least one vibration element is arranged on a driver's seat and/or on a vehicle structure.

3. The motor vehicle according to claim 1, wherein the at least one vibration element is arranged on a steering device of the motor vehicle, a gas pedal, a brake pedal and/or a transmission control element, and/or the at least one vibration element is arranged on a driver's seat and/or on a vehicle floor.

4. The motor vehicle according to claim 1, wherein the at least one vibration element includes a linear resonant actuator or an actuator with an eccentric rotating mass.

5. The motor vehicle according to claim 1, wherein the operating state information describes a current and/or a predicted rotary speed of one component of the drive train and/or of the at least one electric traction motor, wherein the controller, in operation, determines at least one frequency and/or at least one amplitude of the first haptic signal based on the current and/or the predicted rotary speed.

6. The motor vehicle according to claim 1, wherein the operating state information describes a current and/or a predicted rotary speed of the at least one wheel of the drive train and/or of the at least one electric traction motor, wherein the controller is adapted to determine at least one frequency and/or at least one amplitude of the first haptic signal based on the current and/or the predicted rotary speed.

7. The motor vehicle according to claim 1, wherein the operating state information describes a current torque and/or a predicted torque of one component of the drive train, wherein the controller, in operation, determines at least one frequency and/or at least one amplitude of the first haptic signal based on the current torque and/or the predicted torque.

8. The motor vehicle according to claim 1, wherein the operating state information describes a current torque and/or a predicted torque of the at least one electric traction motor, wherein the controller, in operation, determines at least one frequency and/or at least one amplitude of the first haptic signal based on the current torque and/or the predicted torque.

9. The motor vehicle according to claim 1, wherein the operating state information describes a current state of adhesion and/or a predicted state of adhesion of the at least one wheel of the drive train, wherein the controller, in operation, determines at least one frequency and/or at least one amplitude of the first haptic signal based on the current state of adhesion and/or the predicted state of adhesion.

10. The motor vehicle according to claim 1, wherein the controller, in operation, determines the first haptic signal based on selection information describing a user selection.

11. The motor vehicle according to claim 1, wherein the motor vehicle comprises multiple vibration elements, and wherein the controller, in operation, activates a partial set of the multiple vibration elements at a same time or based on vibration information describing at least one partial set of the vibration elements to generate at least one haptic signal, and wherein the partial set of the multiple vibration elements is based on a user selection.

12. The motor vehicle according to claim 1, wherein the motor vehicle comprises a loudspeaker device, wherein the controller, in operation, operates the loudspeaker device to generate an acoustic signal based on the first haptic signal and/or the operating state information.

13. The motor vehicle according to claim 1, wherein the controller, in operation, delays a torque output of the at least one electric traction motor by the first haptic signal and/or based on selection information describing a user selection.

14. The motor vehicle according to claim 1, wherein the motor vehicle is configured as a passenger car or a motor-cycle.

15. The motor vehicle according to claim 1, wherein the first haptic signal includes a plurality of first haptic signals having multiple different frequencies corresponding to different rotary speeds of different components of the drive train, and wherein the controller, in operation, superimposes the torque output of the at least one electric traction motor with the plurality of first haptic signals having multiple different frequencies.

16. A method for operating a motor vehicle comprising a controller and a drive train having at least one wheel and at least one electric traction motor that causes the at least one wheel to rotate, the method comprising:

activating, by the controller, the at least one electric traction motor;

activating, by the controller, at least one vibration element that is coupled to at least one component of the motor vehicle; and outputting, by the at least one electric traction motor and the at least one vibration element, a plurality of haptic signals perceivable by a driver of the motor vehicle, wherein the at least one electric traction motor and the at least one vibration element are actuated based on operating state information describing a current and/or a predicted operating state of the drive train, and wherein a torque output of the at least one electric traction motor is superimposed with the haptic signals, wherein the haptic signals include at least a first haptic signal and a second haptic signal that is different from the first haptic signal, wherein the torque output of the at least one electric traction motor is superimposed with the first haptic signal while the motor vehicle is accelerating, wherein the torque output of the at least one electric traction motor is superimposed with the second haptic signal while the motor vehicle is braking, and wherein the second haptic signal simulates an anti-lock braking system.

17. The method according to claim 16, wherein the first haptic signal includes a plurality of first haptic signals having multiple different frequencies corresponding to different rotary speeds of different components of the drive train, and wherein the torque output of the at least one electric traction motor is superimposed with the plurality of first haptic signals having multiple different frequencies.

* * * * *